(12) United States Patent
Zhao et al.

(10) Patent No.: US 11,679,694 B2
(45) Date of Patent: Jun. 20, 2023

(54) LOOP LATCH RELEASE FOR POWER LONG RAIL ASSEMBLY

(71) Applicants: Magna Seating Inc., Aurora (CA); Kai Zhao, Rochester Hills, MI (US); Michael D. Nacy, Lake Orion, MI (US); Detjon Marini, White Lake, MI (US); Louis Vetere, II, Commerce Township, MI (US); Cheikh Dioum, Rochester Hills, MI (US)

(72) Inventors: Kai Zhao, Rochester Hills, MI (US); Michael D Nacy, Lake Orion, MI (US); Detjon Marini, White Lake, MI (US); Louis Vetere, II, Commerce Township, MI (US); Cheikh Dioum, Farmington Hills, MI (US)

(73) Assignee: Magna Seating Inc, Aurora (CA)

( * ) Notice: Subject to any disclaimer, the term of this patent is extended or adjusted under 35 U.S.C. 154(b) by 50 days.

(21) Appl. No.: 17/415,136

(22) PCT Filed: Dec. 17, 2019

(86) PCT No.: PCT/US2019/066701
§ 371 (c)(1),
(2) Date: Jun. 17, 2021

(87) PCT Pub. No.: WO2020/131777
PCT Pub. Date: Jun. 25, 2020

(65) Prior Publication Data
US 2022/0048411 A1    Feb. 17, 2022

Related U.S. Application Data
(60) Provisional application No. 62/780,579, filed on Dec. 17, 2018.

(51) Int. Cl.
  *B60N 2/02* (2006.01)
  *B60N 2/07* (2006.01)
  (Continued)

(52) U.S. Cl.
  CPC ......... *B60N 2/0881* (2013.01); *B60N 2/0818* (2013.01); *B60N 2/0875* (2013.01);
  (Continued)

(58) Field of Classification Search
  CPC .. B60N 2/0232; B60N 2/0705; B60N 2/0806; B60N 2/0812; B60N 2/0818;
  (Continued)

(56) References Cited

U.S. PATENT DOCUMENTS 5,323,998 A * 6/1994 Aihara .................. B60N 2/067
                                                         248/419
5,903,122 A * 5/1999 Mesnage .............. B60N 2/0248
                                                         318/469
(Continued)

*Primary Examiner* — Jonathan Liu
*Assistant Examiner* — Guang H Guan
(74) *Attorney, Agent, or Firm* — Miller Canfield

(57) ABSTRACT

A power long rail assembly is attached to a vehicle floor for repositioning vehicle seats in a vehicle between a plurality of seating positions. The power long rail assembly includes a fixed long rail and a power rail drive assembly configured to travel along the fixed long rail. The power rail drive assembly has an upper channel having a driving wheel configured to frictionally and/or meshingly engage with the fixed long rail, a fore/aft motor operatively coupled to the driving wheel, a latch assembly for locking the upper channel to the fixed long rail, and a latch release mechanism having a latch motor operatively coupled to a release plunger for automatically unlocking the latch assembly from the fixed long rail, and a fore/aft button operatively coupled to the fore/aft motor and to the latch motor to selectively activate the fore/aft motor and the latch motor.

23 Claims, 6 Drawing Sheets

(51) Int. Cl.
  *B60N 2/08* (2006.01)
  *B60N 2/90* (2018.01)
(52) U.S. Cl.
  CPC .......... *B60N 2/0232* (2013.01); *B60N 2/0705* (2013.01); *B60N 2002/924* (2018.02)
(58) Field of Classification Search
  CPC .. B60N 2/0831; B60N 2/0862; B60N 2/0868; B60N 2/0875; B60N 2/0881; B60N 2/0887; B60N 2/0893; B60N 2002/924
  See application file for complete search history.

(56) References Cited

U.S. PATENT DOCUMENTS

| | | | |
|---|---|---|---|
| 6,691,971 B2 | 2/2004 | Yamada et al. | |
| 6,986,493 B2 * | 1/2006 | Yokota | B60N 2/0825 248/424 |
| 7,331,558 B2 | 2/2008 | Jeong | |
| 7,775,595 B2 | 8/2010 | McMillen et al. | |
| 8,052,112 B2 * | 11/2011 | Lawall | B60N 2/0881 297/344.11 |
| 8,844,891 B2 | 9/2014 | Yamada et al. | |
| 9,010,860 B2 * | 4/2015 | Kume | B60N 2/0232 297/344.1 |
| 9,033,299 B2 * | 5/2015 | Kramm | B60N 2/0705 297/344.1 |
| 9,827,879 B2 * | 11/2017 | Fujita | B60N 2/0881 |
| 10,011,195 B2 | 7/2018 | Kume et al. | |
| 10,065,531 B2 * | 9/2018 | Ferre | B60N 2/0818 |
| 10,562,411 B2 * | 2/2020 | Higuchi | B60N 2/0232 |
| 10,618,431 B2 * | 4/2020 | Higuchi | B60N 2/0727 |
| 10,759,311 B2 * | 9/2020 | Petit | B60N 2/0818 |
| 10,857,910 B2 * | 12/2020 | Madhu | B60N 2/123 |
| 10,906,429 B2 * | 2/2021 | Akutsu | B60N 2/08 |
| 11,345,259 B2 * | 5/2022 | Marini | B60N 2/43 |
| 2007/0013218 A1 | 1/2007 | Kayumi et al. | |
| 2013/0162000 A1 | 6/2013 | Kume et al. | |
| 2018/0037140 A1 | 2/2018 | Gollhardt et al. | |
| 2018/0334054 A1 | 11/2018 | Higuchi et al. | |
| 2019/0084453 A1 | 3/2019 | Petit | |
| 2020/0108737 A1 * | 4/2020 | Runde | B60N 2/0707 |
| 2021/0347282 A1 * | 11/2021 | Bozintan | B60N 2/067 |
| 2021/0370804 A1 * | 12/2021 | Zhao | B60N 2/015 |
| 2022/0017000 A1 * | 1/2022 | Zhao | B60N 2/0715 |
| 2022/0048411 A1 * | 2/2022 | Zhao | B60N 2/0818 |
| 2022/0161691 A1 * | 5/2022 | Zhao | B60N 2/0715 |
| 2022/0219569 A1 * | 7/2022 | Zhao | B60N 2/0875 |
| 2022/0396179 A1 * | 12/2022 | Zhao | B60N 2/01516 |

\* cited by examiner

LOOP LATCH RELEASE FOR POWER LONG RAIL ASSEMBLY

CROSS-REFERENCE TO RELATED APPLICATIONS

This application claims priority to U.S. Provisional Application 62/780,579, filed on Dec. 17, 2018, the disclosure of which is hereby incorporated by reference in its entirety.

BACKGROUND OF THE INVENTION

1. Field of the Invention

The present invention relates to a power long rail assembly that supports a seat within an automotive vehicle and is configured to travel along a fixed long rail when the vehicle seat is repositioned to another location along the long rail. More particularly, the invention relates to a latch release mechanism for the power long rail assembly configured to automatically unlock a manual latch in response to actuation of an electrical switch.

2. Description of Related Art

Various slide mechanisms are known for repositioning a vehicle seat along a fixed long rail in a vehicle. An example of a known slide mechanism is disclosed in U.S. Pat. No. 10,011,195 wherein a vehicle seat is coupled to a slide mechanism that is slidable within a fixed long rail. The slide mechanism includes a movable rail having rollers configured to travel along the fixed long rail. A latch releasably couples the movable rail with the fixed long rail. The latch typically includes metal fingers and/or wire loops operatively coupled to the movable rail and repositionable between an unlocked position and a locked position engaged with slots, holes, and/or notches in the fixed long rail. The vehicle seat includes a release handle operatively coupled to the latch and configured to manually unlock the latch permitting sliding movement of the vehicle seat along the fixed long rail. Typically, the release handle is operatively coupled to the latch via a cable and/or a mechanical linkage. Actuating the release handle causes the latch to retract the fingers and/or the wire loops out of the slots, holes, and/or notches in the fixed long rail. Once the latch is in the unlocked position, the vehicle seat can be manually repositioned to another location along the fixed rail. When the vehicle seat is in a desired location, the release handle is returned to an unactuated position causing the latch to relock with the fixed long rail.

This known slide mechanism is manually repositioned along the fixed long rail since this slide mechanism lacks a power rail drive assembly. Further, this slide mechanism lacks a power-driven latch release mechanism configured to automatically reposition the latch between a locked position and an unlocked position. Finally, access to the release handle is limited since the release handle location is restricted, in part, by a cable and/or a linkage operatively coupled between the release handle and the latch.

It is desirable, therefore, to have a power long rail assembly configured to automatically reposition the vehicle seat along a fixed long rail. Further, it is desirable to have a latch that is automatically unlocked such that the vehicle seat can be repositioned along the fixed long rail. In addition, it is desirable to replace the release handle with an electrical switch positioned at any desired or convenient location. Finally, it is desirable to replace the cable and/or linkage between the release handle and the latch with a motor-driven latch release mechanism.

SUMMARY OF THE INVENTION

A power long rail assembly is provided for transposing a vehicle seat within a vehicle. The power long rail assembly comprises a fixed long rail and a rail drive assembly configured to be transposed along the fixed long rail in a fore direction and an opposite aft direction. A latch is operatively coupled to said rail drive assembly and repositionable between a locked position and an unlocked position. The latch is spring-biased towards the locked position, wherein when the latch is in the locked position, the rail drive assembly is interlocked with the fixed long rail preventing movement of the rail drive assembly, and when the latch is in the unlocked position, the rail drive assembly is transposable along the fixed long rail. A latch release mechanism is operatively coupled with the latch, the latch release mechanism including a latch motor having a first drive shaft operatively coupled to a release plunger and configured to move the release plunger between a retracted position and an extended position. When the release plunger is in the extended position, the release plunger engages and actuates the latch to the unlocked position, and when the release plunger is in the retracted position, the latch automatically locks with the fixed long rail.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EMBODIMENTS

FIGS. 1-8 illustrate a power long rail assembly having a power rail drive assembly configured to transpose a seat for an automotive vehicle along a fixed long rail for seat position adjustment according to embodiments described herein. Directional references employed or shown in the description, figures or claims, such as top, bottom, upper, lower, upward, downward, lengthwise, widthwise, left, right, and the like, are relative terms employed for ease of description and are not intended to limit the scope of the invention in any respect. Referring to the Figures, like numerals indicate like or corresponding parts throughout the several views.

Figure 1:
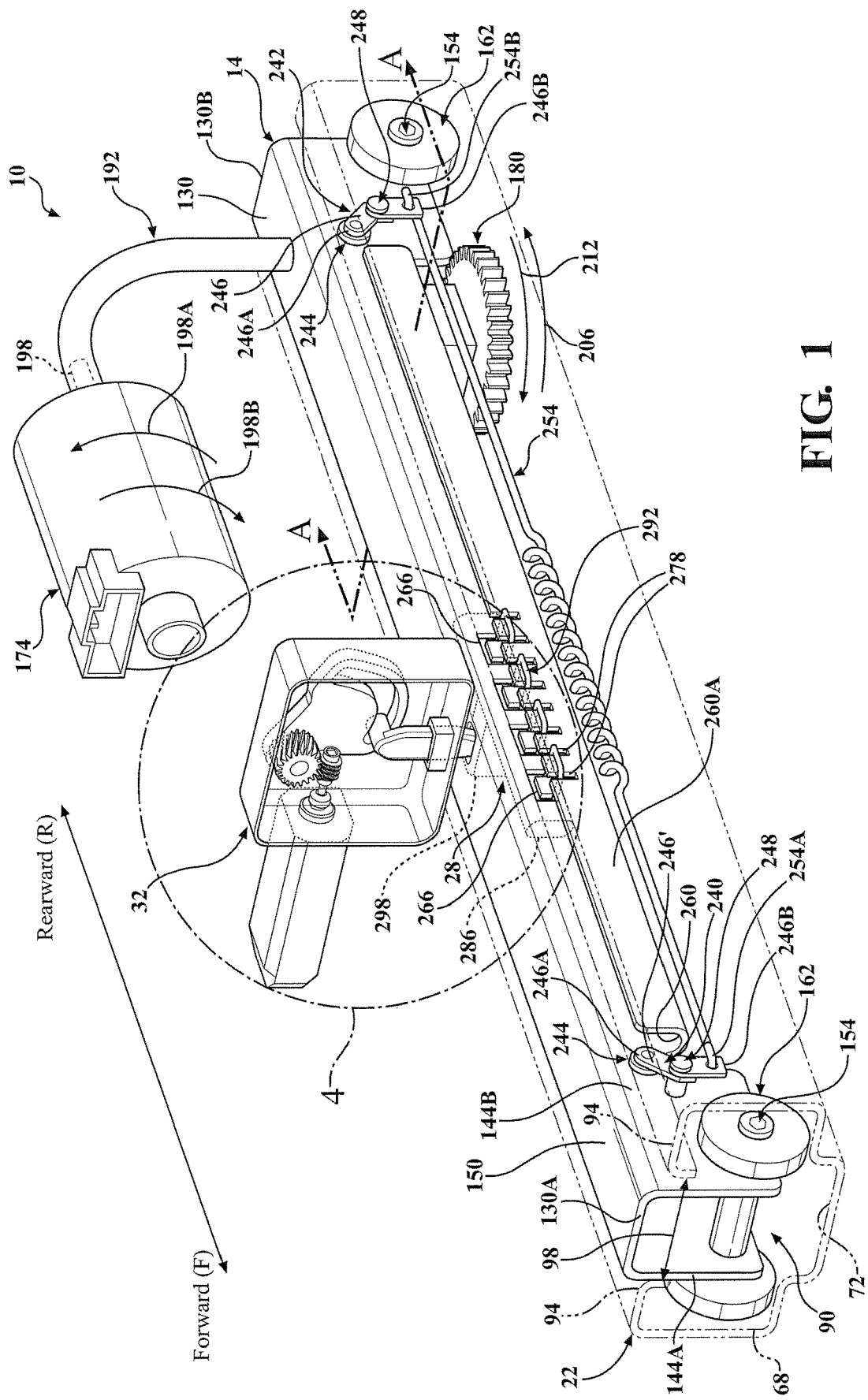
FIG. 1 is a cutaway perspective view of a power long rail assembly including a power rail drive assembly, a latch, and a latch release mechanism, according to one embodiment of the present invention.

FIG. 1 illustrates a power long rail assembly 10 having a power rail drive assembly 14 for adjusting the position of a seat 18 (shown in FIG. 2A) along a fixed long rail 22 within an automotive vehicle, according to one embodiment of the present invention. The power rail drive assembly 14 includes latch 28 to lock the power rail drive assembly 14 to the fixed long rail 22. A latch release mechanism 32 is operatively coupled to the latch 28 and configured to automatically disengage the latch 28 from the fixed long rail 22 and unlock the power rail drive assembly 14 from the fixed long rail 22.

Figure 2A:
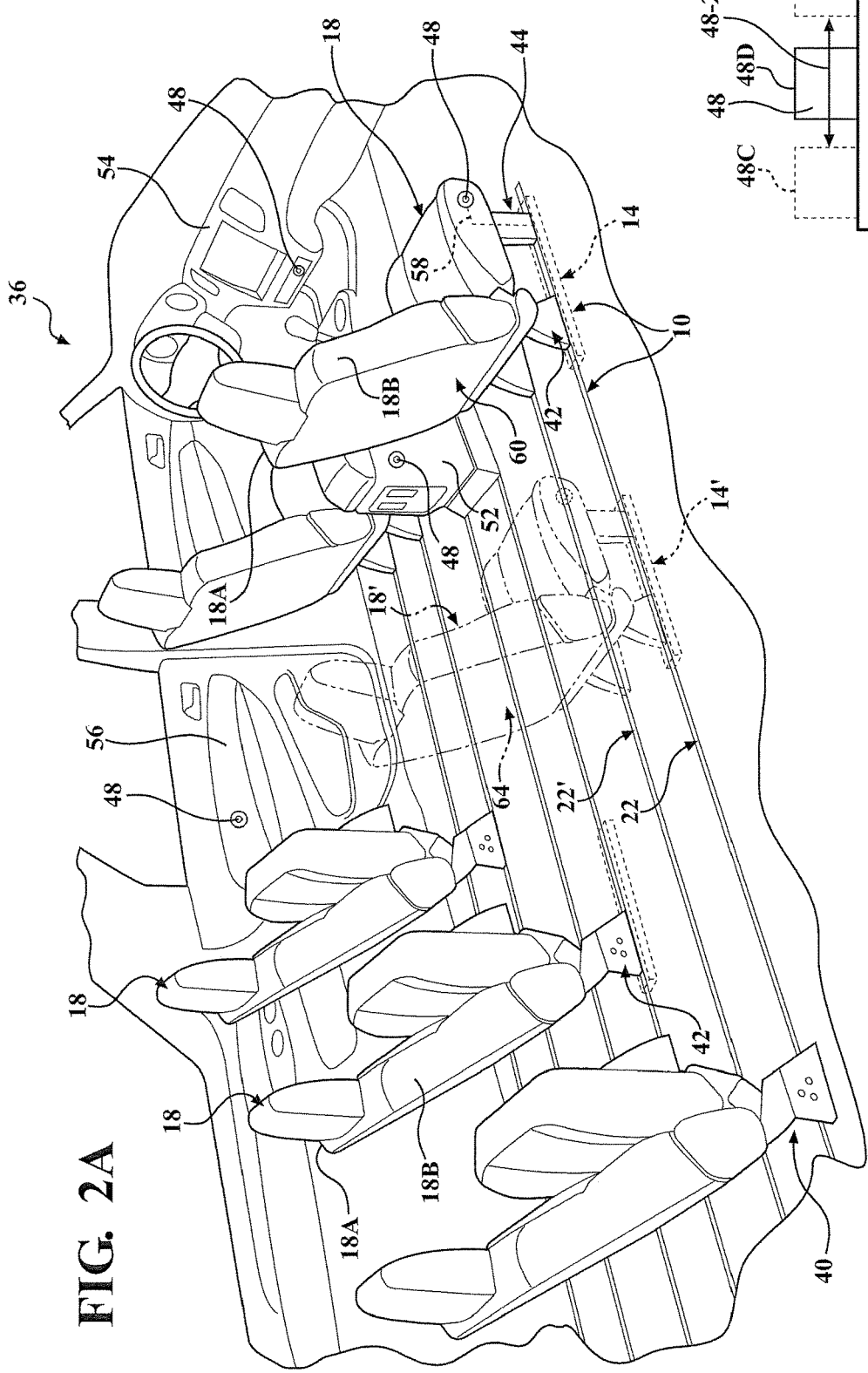
FIG. 2A is a perspective view of an interior of a vehicle having vehicle seats coupled to power long rail assemblies, according to one embodiment of the present invention.

FIG. 2A shows an interior 36 of an automotive vehicle having a plurality of vehicle seats 18 each connected by a power rail drive assembly 14 to the fixed long rails 22 which extend longitudinally along a vehicle floor 40. Each vehicle seat 18 is supported by at least one leg 42 on opposing sides 18A, 18B of the vehicle seat 18, and optionally rear and front legs 42, 44 on the opposing sides 18A, 18B of the vehicle seat 18. The legs 42, 44 are removably coupled to the power rail drive assembly 14 by any method commonly known in the art, such as by a striker and latch mechanism. A latch release switch 48 is positioned to be accessible to an occupant of the vehicle, such as on each vehicle seat 18 and/or a location remote from the vehicle seat 18 such as a center console 52, a front dash location 54, and/or on a vehicle door 56, as non-limiting examples. The latch release switch 48 is alternatively described as a "fore/aft button" 48 and/or "F/A button" 48. The latch release switch 48 is operatively coupled to the latch release mechanism 32 via an electrical cable 58 and/or through a wireless connection. Further, the latch release switch 48 can selectively operate the latch release mechanism 32 as well as the power rail drive assembly 14, as will be further described below.

Figure 2B:
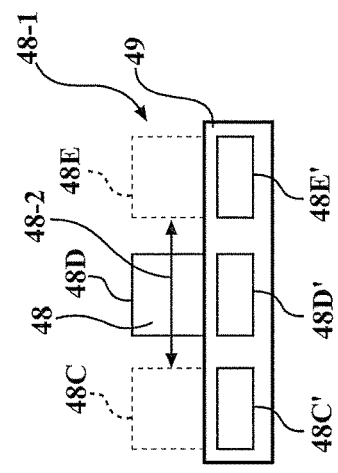
FIG. 2B is a schematic view of a fore/aft button, according to one embodiment of the present invention.

It will be appreciated that the F/A button 48 can be located at any position, as shown in FIG. 2A, within the vehicle, outside of the vehicle, and/or as part of a remote control, and further can include any type of input such as a button, a lever, a selector switch, and/or a software selectable input, as non-limiting examples. The F/A button 48 is part of a button assembly 48-1, illustrated in a block diagram shown in FIG. 2B, having a deactivated position 48D and activated positions 48C, 48E. In addition, the F/A button 48 can optionally be a three position electrical switch 48-1 with the F/A button 48 movable along a switch body 49 between a fore direction activated position 48C, a deactivated position 48D, and an aft direction activated position 48E, as a non-limiting example and as shown in FIG. 2B. The motion of the F/A button 48 is illustrated by arrow 48-2. When the F/A button 48 is moved to the fore direction activated position 48C on the button assembly 48-1, the F/A button 48 electrically connects with a fore direction electrical contact 48C'. When the F/A button 48 is moved to the aft direction activated position 48E on the button assembly 48-1, the F/A button 48 electrically connects with an aft direction electrical contact 48E'. When the F/A button 48 is moved to the deactivated position 48D, the F/A button 48 optionally electrically connects with a deactivated electrical contact 48D' and/or is spaced apart from the aft direction electrical contact 48E' and the fore direction electrical contact 48C'.

Further, an occupant (not shown) of the vehicle may push/press the F/A button 48 (shown in FIG. 2B) to transition the F/A button 48 from the deactivated position 48D to one of the fore direction activated position 48C and/or the aft direction activated position 48E to initiate motion of the vehicle seat 18 along the fixed long rail 22 in the respective forward F or rearward R directions, as desired. Optionally, the occupant releases the F/A button 48, to move the F/A button 48 from one of the fore position 48C and the aft position 48E to the deactivated position 48D, when the vehicle seat 18 is transposed from a current vehicle seat position 60 to a desired vehicle seat position 64 to lock the vehicle seat 18 to the fixed long rail 22.

Referring to FIG. 2A, each power rail drive assembly 14 travels along one of the fixed long rails 22, 22' attached to the vehicle floor 40 in the fore direction F ("forward direction") and the aft direction R ("rearward direction"). Each vehicle seat 18 is mounted to a power rail drive assembly 14 and therefore travels along a pair of the fixed long rails 22, 22' wherein the vehicle seat 18 is repositioned between the first vehicle seat location 60 and the second vehicle seat location 64 (shown in phantom as a vehicle seat 18' attached to a power rail drive 14'). The fixed long rails 22, 22' can extend for any length suitable for an intended application. Likewise, any suitable number of fixed long rails 22, 22' can be positioned on the vehicle floor 40 as desired for an intended application. Thus, the power long rail assembly 10 allows for improved vehicle seat 18 position adjustment since the vehicle seat 18 is coupled to at least one power rail drive assembly 14 that is repositionable to any vehicle seat position 60, 64 along the at least one fixed long rail 22.

Figure 3:
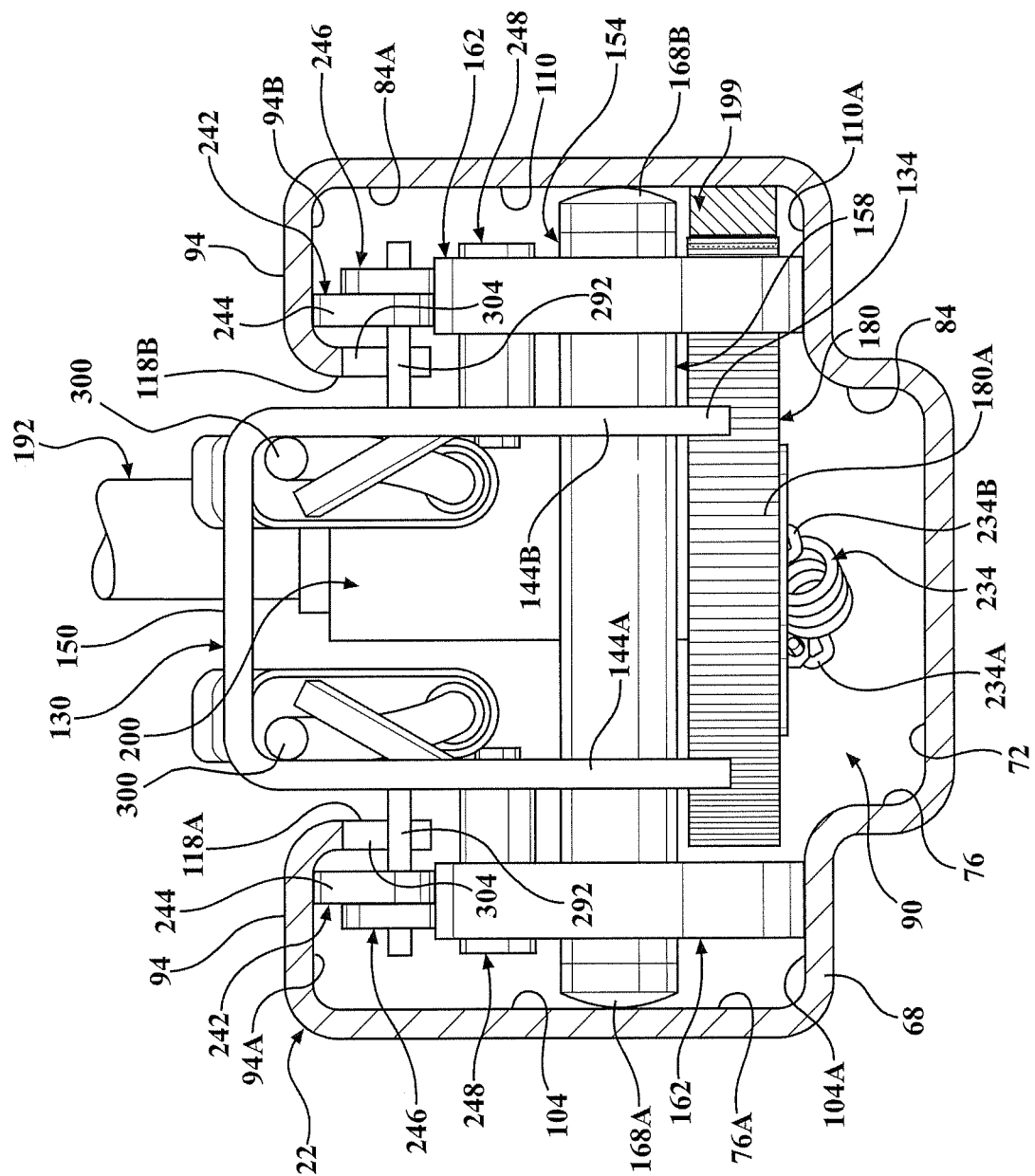
FIG. 3 is a cross-sectional view of the power long rail assembly of FIG. 1 taken along section line A-A shown in FIG. 1, according to one embodiment of the present invention.

As shown in FIGS. 1 and 3, the fixed long rail 22 has a generally U-shaped cross-sectional profile 68 extending longitudinally along the floor 40 of the vehicle, a bottom wall 72, opposing side walls 76, 84, an interior channel 90, and a top wall 94 having an elongated opening 98 extending in a longitudinal direction of the fixed long rail 22. Each side wall 76, 84 of the fixed long rail 22 includes a track 104, 110 having a generally C-shaped cross-sectional profile with each track 104, 110 having a track bottom wall 104A, 110A, a track outer side wall 76A, 84A, a track top wall 94A, 94B, and a retaining lip 118A, 118B extending downward from the track top wall 94A, 94B and spaced apart from the adjacent track outer side wall 76A, 84A. As illustrated in FIG. 3, each track bottom wall 104A, 110A is optionally positioned above the bottom wall 72 of the fixed long rail 22. The fixed long rail 22 is a stamped, formed, molded, and/or rolled section of a metal or plastic material and having a length selected based on a specific application. It should be appreciated that the size, shape, and length of the fixed long rail 22 may vary without altering the scope of the invention.

Also shown in FIGS. 1 and 3, the power rail drive assembly 14 includes an elongated upper channel 130 having a generally inverted U-shaped cross-sectional profile 134 and extending in a longitudinal direction, opposing first and second side walls 144A, 144B and a top wall 150 extending between the opposing first and second side walls 144A, 144B. An axle 154 extends laterally through a hollow tube 158 extending between the opposing side walls 144A, 144B. A wheel 162 is fixedly coupled to the axle 154 near each end 168A, 168B of the axle 154. The power rail drive assembly 14 shown in the embodiment of FIG. 1 includes a pair of wheels 162 adjacent to opposing ends 130A, 130B of the upper channel 130. While not shown in the Figures, the wheels 162 can be replaced with rollers and/or glides. Any number and/or combination of wheels 162, rollers, and/or glides may be used as suitable for an intended application. Further, each wheel 162 or roller can be rotationally attached to the upper channel 130 using a shaft fixedly coupled to one of the side walls 144A, 144B of the upper channel 130 instead of the axle 154 extending through the upper channel 130.

As also shown in FIG. 1, the power rail drive assembly 14 includes an electric motor 174 operatively coupled to a driving wheel 180. The electric motor 174 is described hereinafter as a "fore-aft motor" 174. A flexible shaft 192 is operatively coupled between an output shaft 198 of the fore-aft motor 174 and the driving wheel 180. The driving wheel 180 fictionally and/or meshingly engages with the fixed long rail 22 and/or with a rack gear 199 extending longitudinally along one side wall 76A, 84A of the fixed long rail 22. The driving wheel 180 is a plastic gear 180 having a plurality of gear teeth 180A in the embodiment shown in FIG. 3. The driving wheel 180 is not a load-carrying component. Further, the gear teeth on the rack gear 199 prevent driving slip since the gear teeth on the rack gear 199 meshingly engage with the gear teeth 180A on the driving wheel 180.

In the embodiment shown in FIGS. 1 and 3, the shaft 192 is operatively coupled to a gear box 200 with the gear box 200 being operatively coupled to the driving wheel 180. Energizing the fore-aft motor 174 to rotate the output shaft 198 in a first rotational direction 198A rotates the flexible shaft 192 causing the attached lateral driving wheel 180 to rotate in a forward direction 206 transposing the power rail drive assembly 14 in the forward direction F along the fixed long rail 22. Energizing the fore-aft motor 174 to rotate the output shaft 198 in a second rotational direction 198B opposite the first rotational direction 198A, rotates the flexible shaft 192 causing the attached driving wheel 180 to rotate in a reverse direction 212 transposing the power rail drive assembly 14 along the fixed long rail 22 in the rearward direction R.

Also shown in FIG. 3, the driving wheel 180 is spring-loaded to engage with the rack gear 199 in the interior channel 90. A tension spring 234 is fixedly coupled at a first spring end 234A to the upper channel 130 with a second spring end 234B fixedly coupled to the driving wheel 180 such that the tension spring 234 biases the driving wheel 180 towards an engaged position (shown in FIG. 3) with the rack gear 199. It should be appreciated that the size, shape, and configuration of the tension spring 234, including attachment locations may vary without altering the scope of the invention.

A pair of stability rolling elements 240, 242, shown in FIGS. 1 and 3, is rotationally coupled to each side wall 144A, 144B of the upper channel 130. Each stability rolling element 240, 242 includes a roller 244 rotationally coupled to an arm 246, 246' near an upper end 246A of the arm 246, 246', the arm 246, 246' being rotatably coupled to a support stud 248. Each support stud 248 is fixedly coupled to one of the side walls 144A, 144B of the upper channel 130. The support stud 248 and the arms 246, 246' can be orientated at any suitable angle with respect to the side walls 144A, 144B of the upper channel 130 suitable for a specific application without altering the scope of the invention.

Referring to FIG. 1, a first end 254A of a stability torsion spring 254 is connected to a lower end 246B of one of the arms 246, 246'. A second end 254B of the stability torsion spring 254 is connected to a lower end 246B of the other of the arms 246, 246'. The stability torsion spring 254 biases the rollers 244 towards the adjacent fixed long rail 22 top wall 94A, 94B and/or side walls 76A, 84A.

Further details and alternate embodiments of the power rail drive assembly 14 and fixed long rail 22 are more fully described in PCT Application No. PCT/US2019/55835, filed Oct. 11, 2019, which is hereby incorporated herein by reference in its entirety.

The latch 28 is integrated with the power rail drive assembly 14, as shown in FIG. 1. The latch 28 locks the power rail drive assembly 14 with the fixed long rail 22 so that the vehicle seat 18 is retained in any one of its seat positions 60, 64 during use and system loading events. An enlarged fragmentary view of FIG. 1 is shown in FIG. 4 illustrating the latch 28, the latch release mechanism 32, and a portion of the upper channel 130 of the power rail drive assembly 14.

Figure 4:
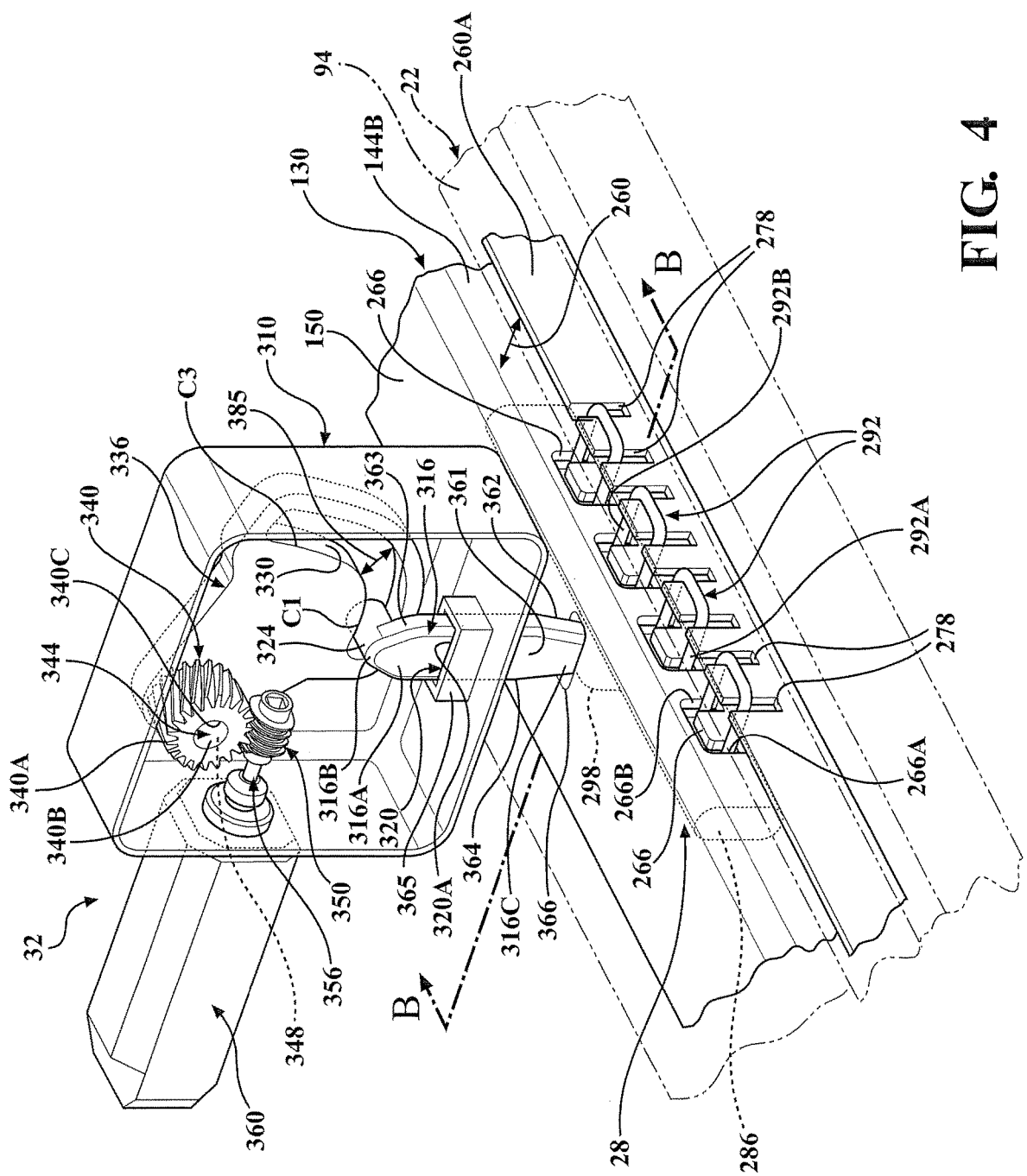
FIG. 4 is a fragmentary perspective view the power long rail assembly of FIG. 1.

Referring to FIG. 4, a portion of at least one side wall 144A, 144B of the upper channel 130 is bent upward to form an outer channel wall 260A spaced apart from the at least one side wall 144A, 144B and defining a generally U-shaped channel(s) 260 therebetween. A plurality of generally inverted U-shape slots or notches 266, are arranged in the at least one side wall 144A, 144B of the upper channel 130 and spaced apart in the longitudinal direction of the upper channel 130. Generally vertical notches or slots 278 are spaced along the outer channel wall(s) 260A aligned with a respective side 266A, 266B of the U-shaped slots 266 in the at least one side wall 144A, 144B.

The latch 28, shown in FIG. 4, includes a latch retainer 286 with a plurality of generally U-shaped loops 292 having loop side portions 292A, 292B extending laterally through the U-shaped slots 266 in the side wall(s) 144A, 144B and through the slots 278 in the outer channel wall(s) 260A. The embodiment shown in FIG. 4 includes four U-shaped loops 292, however, any suitable number of loops 292 may be used without altering the scope of the invention. The latch 28 is alternatively described as a "4-loop" latch 28 wherein the latch 28 includes four loops 292. Optionally, the loops 292 can be replaced by one or more fingers, a plate, and/or pins. The latch retainer 286 further includes a release trigger 298 for disengaging the latch 28 from the fixed long rail 22. Finally, the latch 28 includes a leaf spring 300 to spring-bias the latch 28 upwardly towards the locked position shown in FIG. 4.

When the power rail drive assembly 14 is assembled with the fixed long rail 22, the retaining lips 118A, 118B are positioned between the side walls 144A, 144B of the upper channel 130 and the outer channel wall(s) 260A. The retaining lips 118A, 118B include vertical slots 304 (shown in FIG. 3) spaced along the longitudinal length of the retaining lips 118A, 118B. Alternatively, the vertical slots 304 can be replaced by notches and/or holes as desired for a specific application and latch configuration. Since the latch 28 is spring-biased upwards towards the locked position shown in FIG. 4, the loops 292 are automatically moved between an unlocked position where the loops 292 are disengaged from the vertical slots 304 in the retaining lips 118A, 118B of the fixed long rail 22 and the locked position (shown in FIG. 4) where the loops 292 are frictionally and/or meshingly engaged with the vertical slots 304 in the retaining lips 118A, 118B of the fixed long rail 22. When the loops 292 are engaged with the vertical slots 304 in the retaining lips 118A, 118B of the fixed long rail 22, the power rail drive assembly 14 is locked with the fixed long rail 22 such that the power rail drive assembly 14 is retained in any one of the seat positions 60, 64 during system loading events. When the loops 292 are moved to the unlocked position with respect to the vertical slots 304 in the retaining lips 118A, 118B of the fixed long rail 22, the power rail drive assembly 14 is repositionable along the fixed long rail 22.

The latch release mechanism 32 is shown in FIGS. 1 and 4, according to one embodiment of the present invention. Referring to FIG. 4, the latch release mechanism 32 includes an outer housing 310 and a release plunger 316 passing through a passageway 320 in the outer housing 310, the release plunger 316 having a pin 324 operatively coupled to a control slot 330 in an actuator cam 336. A worm gear 340 is fixedly coupled to the actuator cam 336 and rotatably coupled to a shaft 344 forming an axis of rotation 348 for the worm gear 340 and the actuator cam 336. The shaft 344 is fixedly coupled to the outer housing 310. A worm 350 is meshingly engaged with the worm gear 340 and fixedly coupled to an actuator drive shaft 356, and a latch motor 360 is operatively coupled to the actuator drive shaft 356 for rotatably driving the drive shaft 356 is opposite clockwise and counter-clockwise directions.

Referring to FIG. 4, the release plunger 316 has a generally elongated shaped main body 316A having an upper end 316B, a lower end 316C, front and rear surfaces 361, 362, and opposing sides 363, 364. The pin 324 projects at an angle from the main body 316A near the upper end 316B of the main body 316A, and preferable projects at an angle from the rear surface 362 of the main body 316A. The pin 324 is configured to pass into and/or through the control slot 330 in the actuator cam 336.

As shown in FIG. 4, the release plunger 316 extends through a slot 366 in the top wall 150 of the upper channel 130. The lower end 316C of the release plunger 316 is generally vertically aligned with the release trigger 298 on the latch 28. The passageway 320 in the outer housing 310 includes an opening 320A having a lip 365 extending along at least a portion of the opening 320A. The lip 365 and the passageway 320 are configured to generally support and maintain the alignment of the release plunger 316 with the release trigger 298 and with the slot 366 in the top wall 150 of the upper channel 130.

Also shown in FIG. 4, the worm gear 340 is a generally cylindrical gear having a plurality of gear teeth 340A distributed around the circumference of the worm gear 340 and generally equidistant from a center 340B of the worm gear 340. The worm gear 340 is rotationally coupled to the shaft 344 passing through an aperture 340C aligned with the center 340B of the worm gear 340.

Figure 5:
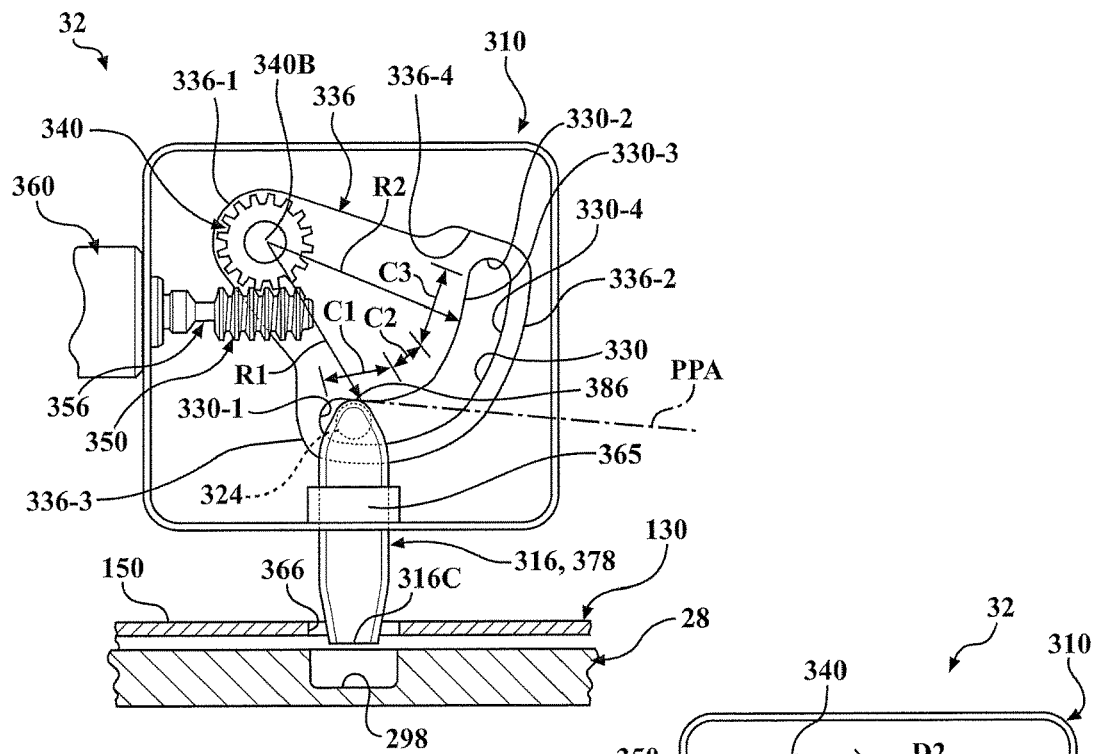
FIG. 5 is a cross-sectional view the power long rail assembly of FIG. 4 showing the latch release mechanism having a release plunger in a retracted position.
Figure 6:
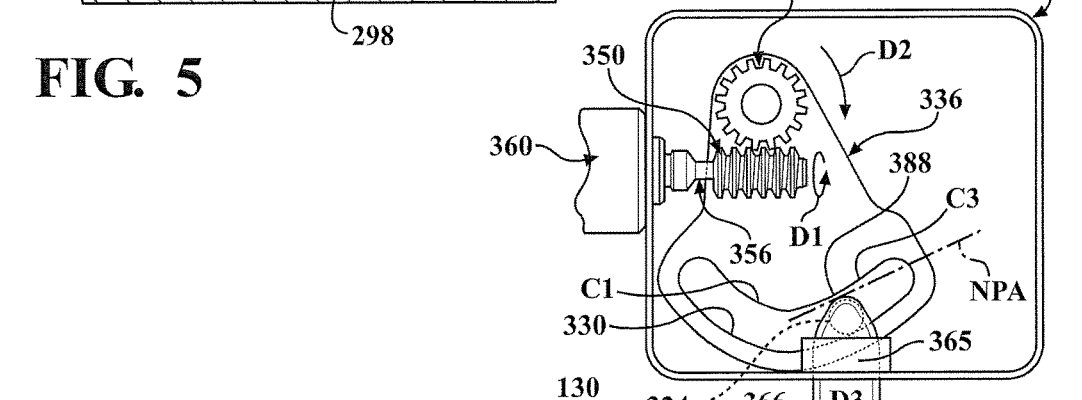
FIG. 6 is a cross-sectional view of the latch release mechanism of FIG. 5 showing the release plunger in an extended position.
Figure 7:
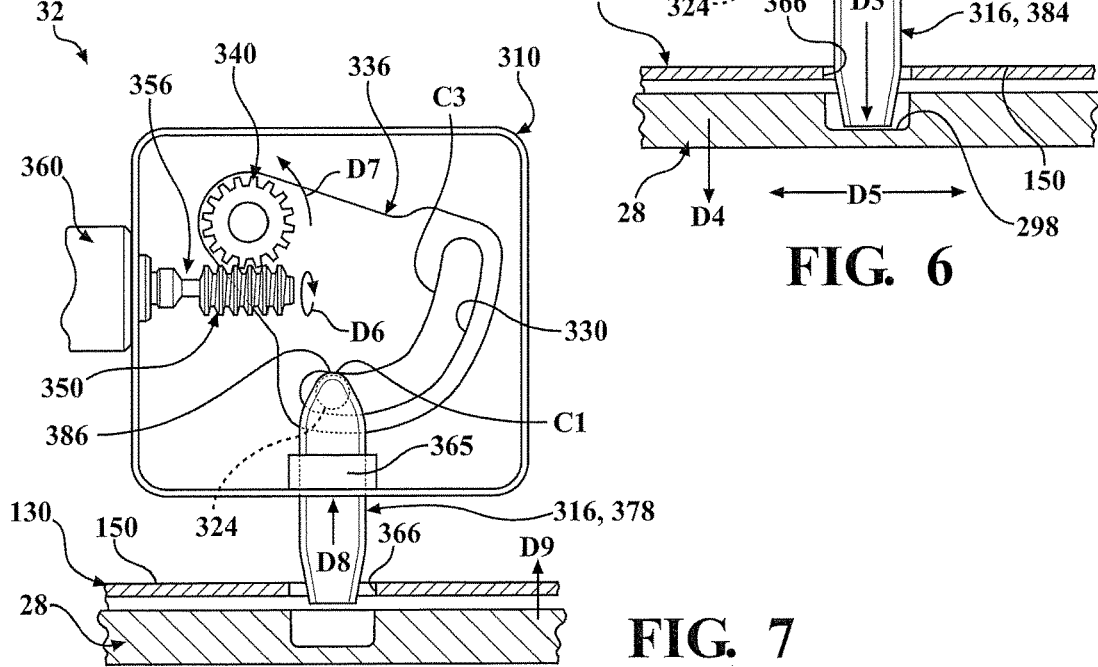
FIG. 7 is a cross-sectional view of the latch release mechanism of FIG. 6 showing the release plunger in the retracted position.

Cross-sectional views of the latch release mechanism 32 of FIG. 4 taken along section line B-B are shown in FIGS. 5-7 illustrating movement of the actuator cam 336 and the release plunger 316 in response to rotation of the worm gear 340. FIG. 5 shows the latch release mechanism 32 in a retracted position 378 such that the latch 28 is locked with the fixed long rail 22. FIG. 6 shows the latch release mechanism 32 in an extended position 384 such that the latch 28 is unlocked from the fixed long rail 22. The latch release mechanism 32 is shown in FIG. 7 in the retracted position 378 with the latch 28 again relocked with the fixed long rail 22.

As shown in FIG. 5, the actuator cam 336 is generally wedge-shaped with a narrow upper end 336-1, a generally arcuate-shaped base 336-2, a leading cam edge 336-3, and a trailing cam edge 336-4. The worm 350 is operatively coupled to the actuator cam 336 near the upper end 336-1 of the wedge shaped cam 336. The control slot 330 extends along a generally arcuate-shaped path adjacent the arcuate-shaped base 336-2 of the actuator cam 336. The control slot 330 includes a leading slot end 330-1 adjacent the leading cam edge 336-3, a trailing slot end 330-2 adjacent the trailing cam edge 336-4, and opposing spaced apart upper and lower side walls 330-3, 330-4. While one or both of the side walls 330-3, 330-4 act as a cam surface with the pin 324 being a follower of the cam surfaces, the lower side wall 330-4 generally follows the contour of the upper side wall 330-3 projected at approximately an increased radius from the center 340B of the worm gear 340 by a predetermined amount. This predetermined amount of radial increase from the center 340B of the worm gear 340 results in a generally uniform gap 385 (shown in FIG. 4) between the upper side wall 330-3 and the lower side wall 330-4. The predetermined amount is selected in part based on the size and shape of the pin 324.

Referring to FIG. 5, the upper and lower side walls 330-3, 330-4 of the control slot 330 generally include a first cam section C1 configured to retract the release plunger 316 away from the release trigger 298, a transition section C2, and a second cam section C3 configured to extend the release plunger 316 towards the release trigger 298. While each of the cam sections C1-C3 may include non-linear contours and may further include arcuate sections having curvatures selected with different and/or varying center of curvature as desired based on a specific application, one embodiment is shown in FIG. 5 illustrating nominal radial distances R1, R2 between an approximate midpoint of cam sections C1, C3 and the center 340B of the worm gear 340, respectively. The radial distance R1 is selected such that the release plunger 316 is in the retracted position 378 (shown in FIG. 5) when the pin 324 is in contact with cam section C1. The radial distance R2 is selected such that the release plunger 316 is in the extended position 384 (shown in FIG. 6) when the pin 324 is in contact with cam surface C3. The difference between radial distance R1 and radial distance R2 is approximately the amount of vertical motion of the release plunger 316 as the pin 324 moves from cam surface C1 to cam surface C3. It will be appreciated that the amount of vertical motion of the release plunger 316 may be more or less than the measured difference between radial distances R1 and R2 since the actual center of radius of each cam section C1, C3 may be offset from the center 340B of the worm gear 340, and further, may be offset from each other.

It should be appreciated that the size, shape, and configuration of the worm 350, the worm gear 340, the actuator cam 336, the control slot 330, and the release plunger 316 may vary, as well as the relative positions and orientations of the release plunger 316 and the release trigger 298 may vary, including the release plunger 316 being repositioned in a non-vertical direction when moving between the retracted position 378 and the extended position 384, as non-limiting examples, without altering the scope of the invention.

As shown in FIG. 5, the cam section C1 profile is preferably selected such that there is a positive pressure angle (PPA) between the cam section C1 and the pin 324 when the release plunger 316 is retracted 378 and the pin 324 is in a first predetermined position 386 along the cam section C1. The pressure angle is the angle between the relative direction in which the pin 324 moves along the cam surface (upper and lower side walls 330-3, 330-4) and the surface normal at the point the pin 324 contacts the cam surface (upper and lower side walls 330-3, 330-4). Referring to FIG. 6, the cam section C3 profile is preferably selected such that there is a negative pressure angle (NPA) between the cam section C3 and the pin 324 when the release plunger 316 is extended (shown at 384) and the pin 324 is in a second predetermined position 388 along the cam section C3. When the actuator cam 336 is stationary with the release plunger 316 retracted 378 and the latch motor 360 is deactivated, the positive pressure angle PPA in the cam section C1 assists in retaining the position 386 of the pin 324 within the control slot 330 such that the position of the release plunger 316 is retained. Likewise, when the actuator cam 336 is stationary with the release plunger 316 extended (shown at 384) and the latch motor 360 is deactivated, the negative pressure angle NPA of the cam section C3 assists in retaining the position 388 of the pin 324 within the control slot 330 such that the position of the release plunger 316 is retained.

When the release plunger 316 is disengaged from the release trigger 298 on the latch 28 as shown in FIG. 5, the lower end 316C of the release plunger 316 is positioned within and/or through the slot 366 in the top wall 150 of the upper channel 130 with clearance between the lower end 316C of the release plunger 316 and the release trigger 298. The latch 28 automatically relocks with the fixed long rail 22 since the latch 28 is spring-biased upward.

In operation, when the F/A button 48 transitions from a deactivated position 48D to one of the fore and/or aft activated positions 48C, 48E while the release plunger 316 is disengaged from the release trigger 298, the latch motor 360 rotates the actuator drive shaft 356 and the attached worm 350 in a first rotational direction D1, causing the worm gear 340 to rotate in a clockwise direction D2, as shown in FIG. 6. The pin 324 moves along the control slot 330 towards the cam section C3 as the actuator cam 336 rotates in the clockwise direction D2. The pin 324 rides along the cam section C3 and causes the release plunger 316 to move downward (shown by arrow D3) towards the release trigger 298. When the release plunger 316 applies downward pressure to the release trigger 298 greater than the spring-bias of the latch 28, the release trigger 298 moves downward (shown by arrow D4) and unlocks the loops 292 from the fixed long rail 22. Once the latch 28 is unlocked and the pin 324 arrives in the second predetermined position 388 along cam section C3, the latch motor 360 is deactivated. The negative pressure angle NPA on the cam section C3, with respect to the pin 324, retains the release plunger 316 in the extended position 384 even when voltage to the latch motor 360 is deactivated.

While the latch 28 is unlocked, the vehicle seat 18 can be repositioned along the fixed long rail 22, as shown by arrow D5 in FIG. 6. In the embodiment shown in FIG. 1, the fore-aft motor 174 repositions the power rail drive assembly 14 in the forward (fore) F and/or rearward (aft) R direction while the latch 28 is disengaged and based on the F/A button 48 being in the fore position 48C or the aft position 48E, respectively. The F/A button 48 is deactivated by the occupant releasing the F/A button 48 or repositioning the F/A button 48 to the deactivated position 48D once the power rail drive assembly 14 arrives in the desired location 64. The fore-aft motor 174 is deactivated after the F/A button 48 transitions to the deactivated position 48D. Once the fore-aft motor 174 is deactivated, the latch motor 360 rotates in a second rotational direction D6 different from the first rotational direction D1 causing the worm gear 340 to rotate the actuator cam 336 counterclockwise D7, as shown in FIG. 7. As the pin 324 disengages from the cam section C3 and engages with cam section C1, the release plunger 316 is moved upwards (arrow D8). The latch motor 360 is deactivated after the pin 324 engages with the first predetermined position 386 along the cam section C1. When the release plunger 316 disengages from the release trigger 298, the release trigger 298 moves upwards (arrow D9) relocking the latch 28 with the fixed long rail 22.

After the latch motor 360 is deactivated and the latch 28 relocked with the fixed long rail 22, the fore-aft motor 174 is briefly activated in the fore direction and/or aft direction to confirm that the latch 28 is relocked with the fixed long rail 22. Confirmation of the latch 28 being relocked can be obtained during the activation of the fore-aft motor 174 using a number of methods such as monitoring the current and/or voltage to the fore-aft motor 174 during the activation of the fore-aft motor 174, an electronic sensor, and/or a limit switch, as non-limiting examples.

It will be appreciated that the activation, deactivation, and direction of rotation of the latch motor 360 and the fore-aft motor 174 can be controlled by an electronic controller, electrical limit switches, position sensors, and/or an electrical timer, as non-limiting examples, as is generally known in the art.

Figure 8:
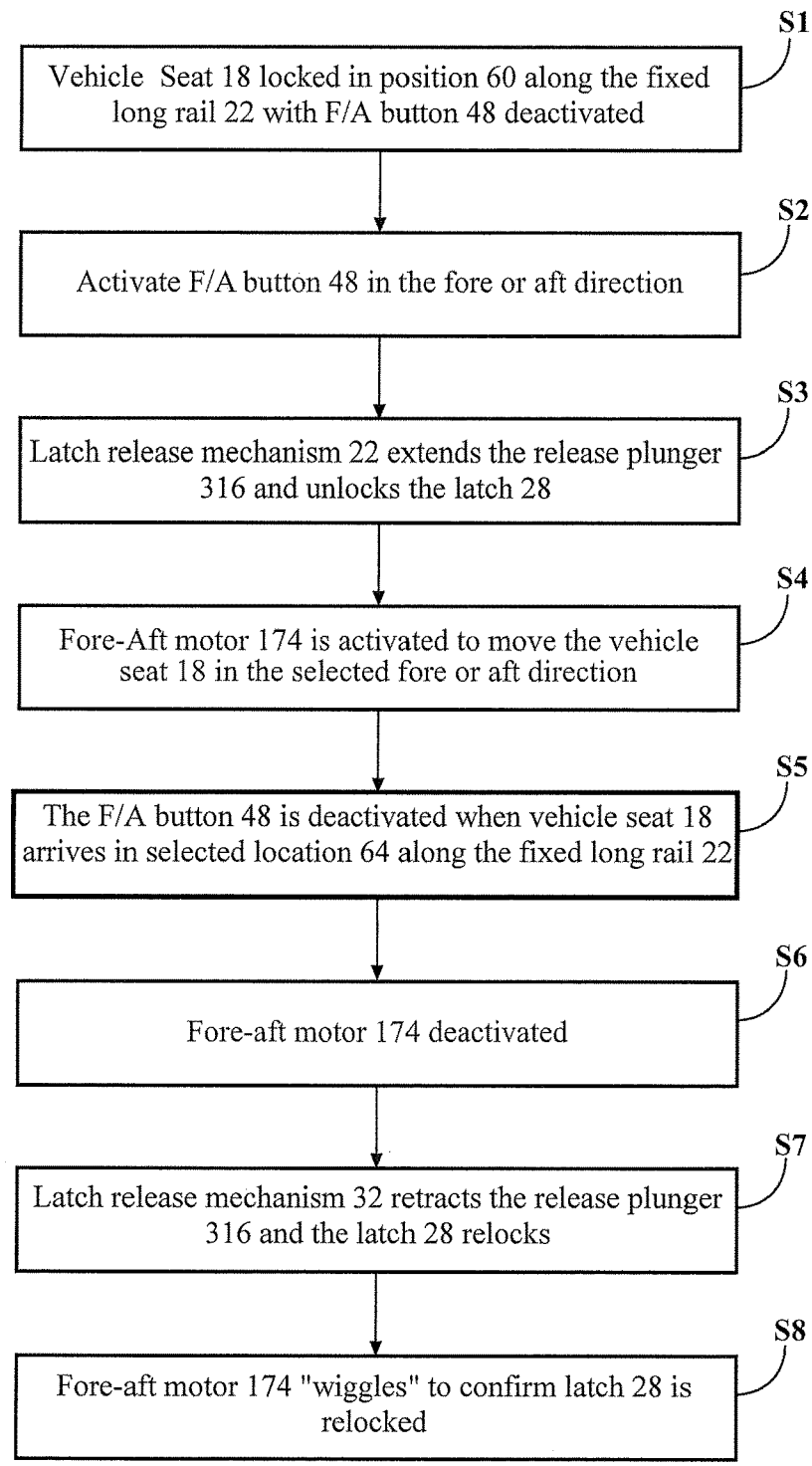
FIG. 8 is flow chart of a method transposing a vehicle seat along a long rail, according to one embodiment of the present invention.

A flowchart 414 of an embodiment of a method 414 of automatically repositioning the vehicle seat 18 with the power rail drive assembly 14 having a latch release mechanism 32 is shown in FIG. 8. The steps include: S1) the vehicle seat 18 is locked in the first vehicle seat position 60 along the fixed long rail 22 with the F/A button 48 deactivated, S2) activate the F/A button 48 in the fore or the aft direction, S3) the latch release mechanism 32 extends the release plunger 316 and unlocks the latch 28, S4) the fore-aft motor 174 is activated to move the vehicle seat 18 in the selected fore or aft direction, S5) the F/A button 48 is deactivated when the vehicle seat 18 arrives at the selected location 64 along the fixed long rail 22, S6) the fore-aft motor 174 is deactivated, S7) the latch release mechanism 32 retracts the release plunger 316 and the latch 28 is relocked, and S8) the fore-aft motor 174 is briefly activated in one or more of the fore and/or the aft directions (i.e., the fore-aft motor 174 "wiggles" in one or both the fore and/or aft directions) to confirm that the latch 28 is relocked. It will be appreciated that the method 414 of repositioning the vehicle seat 18 can include additional steps without varying the scope of the invention.

One benefit of the power long rail assembly is the power rail drive assembly can automatically transpose an attached vehicle seat along a fixed long rail. A second benefit of the power long rail assembly is the latch release mechanism automatically unlocks the latch assembly prior to the power rail drive assembly transposing the attached vehicle seat along the fixed long rail. A third benefit of the power long rail assembly is a fore/aft button is operatively coupled to the power rail drive assembly such that pressing the fore/aft button automatically actuates the latch release mechanism to unlock the latch assembly followed by the power rail drive assembly transposing the attached vehicle seat along the fixed rail to a desired position. A fourth benefit is replacing a release handle and associated linkage and/or cable configured to unlock the latch assembly with a fore/aft button placed in a convenient location.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed is:

1. A power long rail assembly for transposing a vehicle seat within a vehicle, the power long rail assembly comprising:
   a fixed long rail;

a power rail drive assembly including an elongated upper channel configured to be transposed along said fixed long rail in a fore direction and an opposite aft direction;
a latch operatively coupled to said upper channel of said power rail drive assembly and including a release trigger configured to reposition said latch between a locked position and an unlocked position, said latch being spring-biased towards said locked position, wherein when said latch is in said locked position, said power rail drive assembly is interlocked with said fixed long rail preventing movement of said power rail drive assembly, and when said latch is in said unlocked position, said power rail drive assembly is transposable along said fixed long rail; and
a latch release mechanism operatively coupled with said latch, said latch release mechanism including a latch motor, an actuator cam, and a release plunger, said latch motor having a first drive shaft operatively coupled to said release plunger and configured to move said release plunger between a retracted position and an extended position, said actuator cam having a control slot and an axis of rotation and with said actuator cam being rotationally coupled to said first drive shaft, said control slot including a first cam section and a second cam section, said first cam section and said second cam section being spaced apart along said control slot, and said release plunger including a main body and a pin projecting an angle from said main body, said pin operatively coupled to said control slot such that said pin frictionally engages with said first cam section when said release plunger is in said retracted position and said pin frictionally engages with said second cam section when said release plunger is in said extended position;
wherein when said release plunger is in said retracted position, activating said latch motor to rotate said first drive shaft in a shaft first rotational direction routes said actuator cam about said axis of rotation such that said pin frictionally engages with said second cam section and extends said release plunger, and when said release plunger is in said extended position, activating said latch motor to rotate said first drive shaft in a shaft second rotational direction rotates said actuator cam about said axis of rotation such that said pin frictionally engages with said first cam section and retracts said release plunger, wherein said shaft first rotational directional is opposite said shaft second rotational direction; and
wherein when said release plunger is in said extended position, said release plunger frictionally engages with said release trigger and actuates said latch and moves said latch from said locked position to said unlocked position, and when said release plunger is in said retracted position, said release plunger is spaced apart from said release trigger such that said latch automatically locks with said fixed long rail.

2. The power long rail assembly as set forth in claim 1, wherein said power rail drive assembly comprises:
a fore-aft motor having an output shaft operatively coupled to a driving wheel, said driving wheel rotationally coupled to said upper channel and operatively coupled to said fixed long rail;
wherein activating said fore-aft motor to rotate said output shaft in a fore-aft motor first rotational direction rotates said driving wheel in a wheel first rotational direction transposing said power rail drive assembly along said fixed long rail in said fore direction, and activating said fore-aft motor to rotate said output shaft in a fore-aft motor second rotational direction rotates said driving wheel in a wheel second rotational direction transposing said power rail drive assembly along said fixed long rail in said aft direction, said fore-aft motor first rotational direction being opposite said fore-aft motor second rotational direction, and said wheel first rotational direction being opposite said wheel second rotational direction.

3. The power long rail assembly as set forth in claim 2, wherein at least a portion of said first cam section has a positive pressure angle with respect to said pin when said pin is frictionally engaged with said first cam section.

4. The power long rail assembly as set forth in claim 3, wherein at least a portion of said second cam section has a negative pressure angle with respect to said pin when said pin is frictionally engaged with said second cam section.

5. The power long rail assembly as set forth in claim 4, wherein:
said first drive shaft is fixedly coupled to a worm;
a worm gear is fixedly coupled to said actuator cam and aligned with said axis of rotation of said actuator cam, said worm gear being meshingly engaged with said worm; and
wherein rotating said first drive shaft rotates said worm and said worm gear such that said actuator cam rotates about said axis of rotation.

6. The power long rail assembly as set forth in claim 5, wherein:
said latch release mechanism includes an outer housing with said actuator cam rotationally coupled to said outer housing;
said outer housing including a passageway aligned with said release trigger; and
said release plunger extending through said passageway.

7. The power long rail assembly as set forth in claim 6, wherein:
said passageway includes a passageway opening and a lip extending at least partially around said passageway opening; and
wherein said lip retains alignment of said release plunger with said release trigger as said actuator cam is rotated about said axis of rotation.

8. The power long rail assembly as set forth in claim 7, wherein:
said latch includes a loop configured to frictionally and/or meshingly engage with said fixed long rail when said latch is in said locked position; and
wherein when said release plunger is in said extended position, said release plunger frictionally engages said release trigger and repositions said loop from said locked position to said unlocked position with said loop spaced apart from said fixed long rail.

9. The power long rail assembly as set forth in claim 8, wherein
said power long rail assembly including a fore/aft button operatively coupled to said latch motor, said fore/aft button comprising one or more of an electrical switch and/or a software selectable input; and
wherein said fore/aft button transitioning from a deactivated position to an activated position activates said latch motor to rotate said first drive shaft in said shaft first rotational direction, rotating said actuator cam such that said pin disengages from said first cam section and frictionally engages with said second cam section.

10. The power long rail assembly as set forth in claim 9, wherein said latch motor is deactivated after said pin frictionally engages said second cam section in a first predetermined position.

11. The power long rail assembly as set forth in claim 10, wherein said fore/aft button transitioning from said activated position to said deactivated position activates said latch motor to rotate said first drive shaft in said shaft second rotational direction, rotating said actuator cam such that said pin disengages from said second cam section and frictionally engages with said first cam section.

12. The power long rail assembly as set forth in claim 11, wherein said latch motor is deactivated after said pin frictionally engages said first cam section in a second predetermined position.

13. The power long rail assembly as set forth in claim 12, wherein said fore/aft button is a three position electrical switch having a fore direction activated position, said deactivated position, and an aft direction activated position.

14. The power long rail assembly as set forth in claim 13, wherein when said fore/aft button is in said fore direction activated position, and after said latch release mechanism has extended said release plunger unlocking said latch and said latch motor has been deactivated, said fore-aft motor is activated to rotate said output shaft in said fore-aft motor first rotational direction such that said driving wheel is rotated in said wheel first rotational direction transposing said power rail drive assembly along said fixed long rail in said fore direction.

15. The power long rail assembly as set forth in claim 14, wherein when said fore/aft button is in said aft direction activated position, and after said latch release mechanism has extended said release plunger unlocking said latch and said latch motor has been deactivated, said fore-aft motor is activated to rotate said output shaft in said fore-aft motor second rotational direction such that said driving wheel is rotated in said wheel second rotational direction transposing said power rail drive assembly along said fixed long rail in said aft direction.

16. The power long rail assembly as set forth in claim 15, wherein:
said fore/aft button transitioning from one of said fore direction activated position and/or said aft direction activated position to said deactivated position deactivates said fore-aft motor and activates said latch motor to rotate said first drive shaft in said shaft second rotational direction, rotating said actuator cam such that said pin disengages from said second cam section and frictionally engages with said first cam section, and said latch relocks with said fixed long rail.

17. The power long rail assembly as set forth in claim 16, wherein said latch has a plurality of U-shaped loops configured to meshingly engage with a plurality of one or more of a slot, a hole, and/or a notch in said fixed long rail when said latch is locked with said fixed long rail.

18. A latch release mechanism for automatically actuating a latch of a vehicle seat to allow movement of the vehicle seat along a fixed long rail, said latch release mechanism comprising:
a latch motor having a first drive shaft fixedly coupled to a worm, said first drive shaft rotatable in a first rotational direction and a second rotational direction opposite said first rotational direction;
an actuator cam having a control slot with a first cam section spaced apart from a second cam section;
a worm gear fixedly coupled to said actuator cam and configured to meshingly engage with said worm, said worm gear rotationally coupled with an outer housing and having an axis of rotation;
said outer housing including a passageway;
a release plunger extending through said passageway, said release plunger including a main body and a pin projecting at an angle from said main body; and
said pin configured to extend into and/or through said control slot and frictionally engage an adjacent one of said first cam section and said second cam section;
wherein activating said latch motor to rotate said first drive shaft in one of said first and second rotational directions rotates said actuator cam about said axis of rotation such that said pin disengages from one of said first cam section and said second cam section and engages with said other of said first cam section and said second cam section; and
wherein said release plunger is in a retracted position when said pin is frictionally engaged with said first cam section actuating the latch to a locked condition to prevent movement of the vehicle seat, and said release plunger is in an extended position when said pin is frictionally engaged with said second cam section actuating the latch to an unlocked condition thereby allowing movement of the vehicle seat.

19. The latch release mechanism as set forth in claim 18, wherein:
said first cam section has a positive pressure angle with respect to said pin when said pin is frictionally engaged with said first cam section; and
said second cam section has a negative pressure angle with respect to said pin when said pin is frictionally engaged with said second cam section.

20. A method of automatically repositioning a vehicle seat along a fixed long rail, said method comprising:
providing said vehicle seat operatively coupled to said fixed long rail, said vehicle seat including a power rail drive assembly, a latch assembly, and a latch release mechanism, said power rail drive assembly having a fore-aft motor operatively coupled to a driving wheel configured to automatically transpose said vehicle seat along said fixed long rail in a fore direction and an aft direction, said latch assembly having a release trigger configured to reposition said latch assembly from a locked position to an unlocked position, said latch assembly spring-biased towards said locked position, and said latch release mechanism including a latch motor, an actuator cam, and a release plunger, said latch motor having a first drive shaft operatively coupled to said release plunger and configured to move said release plunger between a retracted position and an extended position, said actuator cam having a control slot and an axis of rotation with said actuator cam being rotationally coupled to said first drive shaft, said control slot including a first cam section spaced apart from a second cam section, and said release plunger including a main body and a pin projecting at an angle from said main body, said pin being operatively coupled to said control slot such that said pin frictionally engages with said first cam section when said release plunger is in said retracted position and said pin frictionally engages with said second cam section when said release plunger is in said extended position, wherein when said release plunger is in said extended position, said release plunger frictionally engages with aid release trigger actuating said latch assembly to said unlocked position and when said release plunger is in said retracted position, said release plunger is spaced apart from said release trigger such that said latch assembly automatically returns to said locked position;

providing a fore/aft button operatively coupled to said fore-aft motor and operatively coupled to said latch motor, said fore/aft button having a fore position, a deactivated position, and an aft position wherein when said fore/aft button is in said deactivated position, said fore-aft motor is deactivated, said latch motor is deactivated with said release plunger in said retracted position, and said latch assembly is in said locked position with said fixed long rail;

transitioning said fore/aft button from said deactivated position to one of said fore and/or aft positions;

activating said latch motor causing said first drive shaft and said actuator cam to each route in a first rotational direction such that said pin frictionally engages with said second cam section and repositions said release plunger form said retracted position to said extended position frictionally engaged with said release trigger actuating said latch assembly and moving said latch assembly from said locked position to said unlocked position;

deactivating said latch motor; and activating said fore-aft motor and transposing said power rail drive assembly along said fixed long rail in one of said fore and aft directions.

21. The method as set forth in claim 20, said method comprising:

deactivating said fore-aft motor in response to said fore/aft button transitioning from one of said fore position and said aft position to said deactivated position.

22. The method as set forth in claim 21, said method comprising:

activating said latch motor causing said first drive shaft and said actuator cam to each rotate in a second rotational direction different than said first rotational direction such that said pin frictionally engages with said first cam section and repositions said release plunger from said extended position to said retracted position spaced apart from said release trigger; and automatically moving said latch assembly from said unlocked position to said locked position.

23. The method as set forth in claim 22, said method comprising:

activating said fore-aft motor to transpose said power rail drive assembly in one or more of said fore and/or aft directions to confirm said latch assembly is in said locked position.

* * * * *